Figure 7:
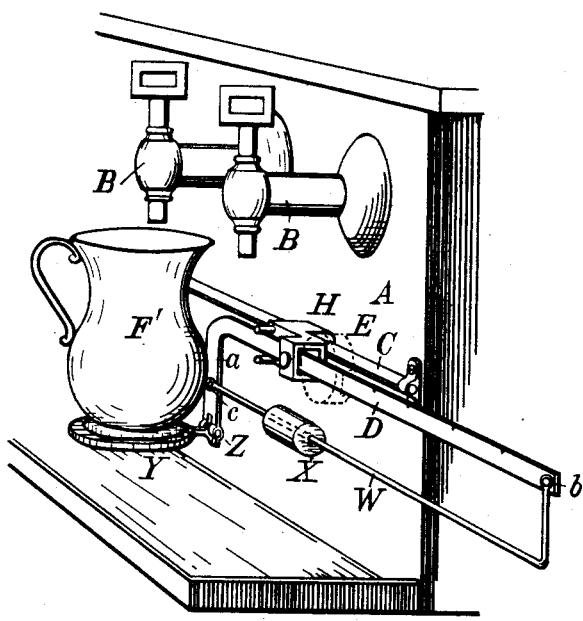

(No Model.) 2 Sheets—Sheet 1.
E. Y. GORDON.
APPARATUS FOR WEIGHING LIQUORS.
No. 472,535. Patented Apr. 12, 1892.
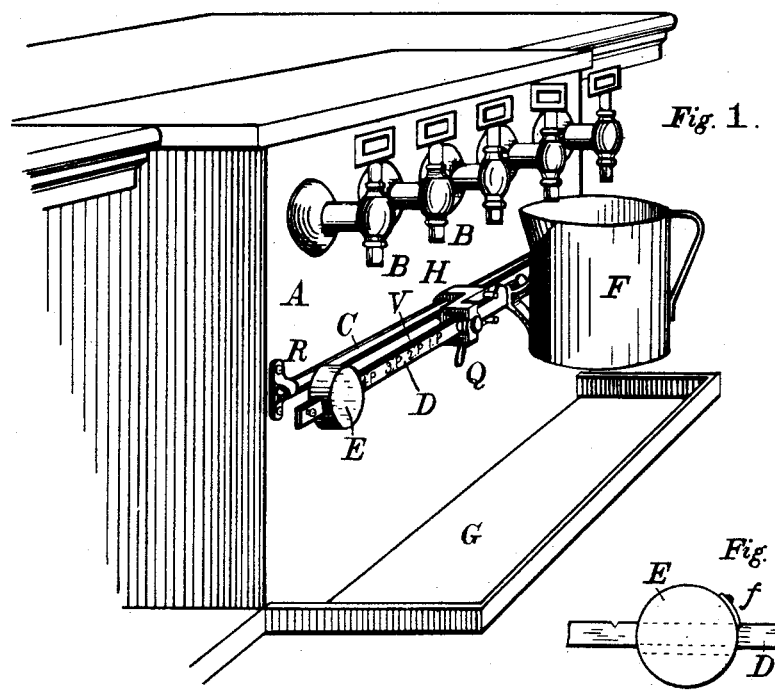
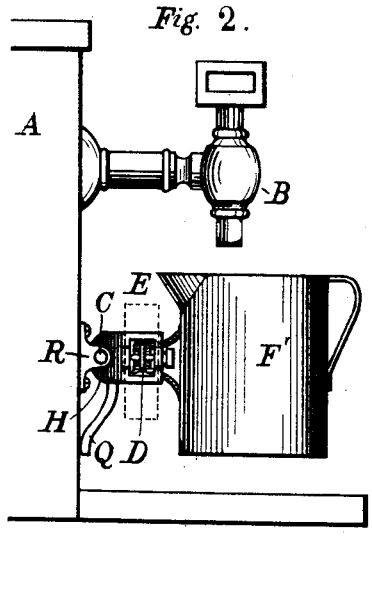
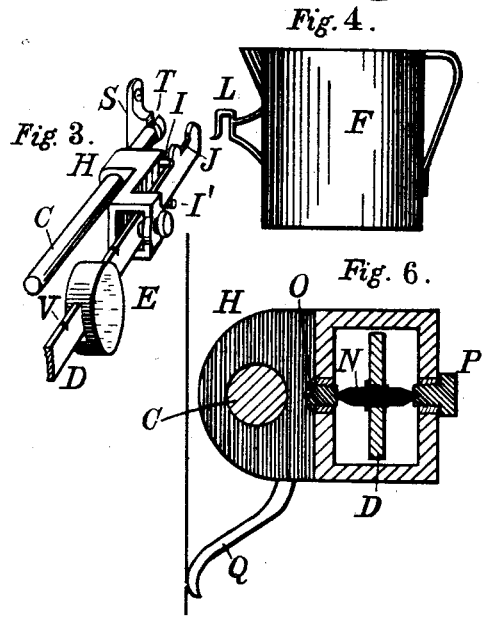
WITNESSES:
R. F. Osgood.
C. J. Crannell.
INVENTOR,
Edward Y. Gordon,
BY
Geo. B. Selden,
ATTORNEY.

(No Model.) 2 Sheets—Sheet 2.
E. Y. GORDON.
APPARATUS FOR WEIGHING LIQUORS.

No. 472,535. Patented Apr. 12, 1892.

WITNESSES:
R. F. Osgood
C. J. Crannell

INVENTOR,
Edward Y. Gordon.
BY Geo. B. Selden,
ATTORNEY.

UNITED STATES PATENT OFFICE.

EDWARD Y. GORDON, OF ROCHESTER, NEW YORK, ASSIGNOR TO CHARLES F. WILKIN, OF SAME PLACE.

APPARATUS FOR WEIGHING LIQUORS.

SPECIFICATION forming part of Letters Patent No. 472,535, dated April 12, 1892.

Application filed January 30, 1892. Serial No. 419,744. (No model.)

*To all whom it may concern:*

Be it known that I, EDWARD Y. GORDON, a citizen of the United States, residing at Rochester, in the county of Monroe, in the State of New York, have invented an Improved Apparatus for Weighing Ale, Beer, &c., of which the following is a specification, reference being had to the accompanying drawings.

My invention relates to an improved apparatus for selling ale, beer, or other liquids by weight, which invention is fully described and illustrated in the following specification and the accompanying drawings, the novel features thereof being specified in the claims annexed to the said specification.

My invention is represented in the accompanying drawings, in which—

Figure 1 is a perspective view. Fig. 2 is a side elevation partially in section. Fig. 3 represents the scale-beam and the supporting-rod on which it slides detached. Fig. 4 represents the measuring-vessel detached. Fig. 5 shows the adjustable-weight. Fig. 6 is a section through the pivots of the scale-beam. Fig. 7 represents a modification in which provision is made for balancing the pitcher or other vessel in which the liquid is bought.

In the accompanying drawings, A represents the bar-counter, ice-box, or other portion of the beer-drawing apparatus to which the faucets B B are attached.

C is a horizontal rod affixed to the counter, ice-box, or other support, and on which the block H, to which the scale-beam D is pivoted, slides. The beam D is provided with a graduated scale representing liquid-measures, such as one pint, two pints, &c.

E is a weight which slides on the beam and which is provided with a catch or projection $f$, Fig. 5, which engages in the notches V on the beam. The sliding block H is provided with the stops I I', Fig. 3, which limit the movement of the scale-beam. The beam is pivoted in the block, as represented in Fig. 6, a screw or screws O P being inserted in the block to support the pivot N of the beam. Any other suitable arrangement may be adopted which will give the beam the requisite freedom of movement.

The measuring-vessel F is provided with a projecting hook L, by which it is detachably connected to the beam in the notch J when in use. When the rod C is made round, the sliding block is provided with a projecting foot or arm Q, which rests against the counter or other support and prevents the block from turning on the rod in consequence of the twist of the weight of the beam and vessel or contents. It will be observed that the supporting-rod is placed close to the counter or support underneath the faucets, and that the scale-beam is located immediately outside the rod so as not to interfere in any way with the ordinary use of the faucets for drawing ale or beer, &c., in glasses. The apparatus is, moreover, made so that it can be readily detached from its support, the rod C being inserted at one end in a socket R and at the other in a socket S, provided with a slot T, which permits the rod carrying the scale-beam to be removed by lifting one end up slightly and then sliding it endwise a short distance out of the socket R. The faucets B B are usually employed to deliver different beverages or the same beverage from different kegs, and the rod C and sliding block H enables the bar-tender to bring the vessel F under any one of the faucets, as may be required, or as he may prefer, so that it is filled with the desired amount of the requisite liquid. By weighing the liquid the customer receives the full value of the quantity he orders and any disputes as to quantity or quality are prevented.

In the modification represented in Fig. 7 I have made provision for counterbalancing the weight of the customer's empty vessel or pitcher and for then weighing the amount of liquid discharged into it. In order to secure this result I provide the scale-beam with a foot Y, on which the pitcher or other vessel F' is placed, and with an additional rod or beam W, on which a weight X slides, by which the vessel is counterbalanced before the liquid is discharged into it. The weight of the liquid is then determined by the weight E on the scale-beam D. The beam D is bent downward, as indicated at $a$, and the foot Y is hinged to the arm at Z, so that when not in use it may be folded up out of the way. The rod W extends parallel to the beam D, being attached thereto at $b$ and $c$, as shown. The foot Y may be attached to the beam by a hook, as L, either with or without the hinge-joint Z.

The manner of using my improved apparatus will have been already understood from the foregoing description. The bar-tender uses the vessel F to measure the quantity of liquid the customer orders and pours it from the vessel F into the pitcher or other vessel, which the customer brings in, or he balances the pitcher on the foot Y, represented in Fig. 7, and then weighs the requisite amount of liquid directly into it by means of the scale-beam D and weight E. The scale-beam D is pivoted in the screws O P in such a way as to resist the lateral strain arising from attaching the vessel F at one side of the beam.

The utility of my invention is shown by the ready adoption it has already secured from persons engaged in the business.

The weighing apparatus being placed underneath the faucets, leaves them entirely unobstructed, so that the bar-tender has free access thereto, and it also being placed close up to the box or counter inside the delivery-spouts of the faucets, is entirely out of the way of any drippings, while its construction is such that it does not become clogged or fouled and it can be readily cleaned.

I claim—

1. The combination, with a series of two or more delivery-faucets, of a horizontal supporting-rod arranged below the faucets, a block adapted to slide on the supporting-rod without turning thereon, a scale-beam pivoted in the block and provided with a graduation and a movable weight, and a measuring-vessel detachably connected to the beam by a lateral arm, which sustains the vessel outside the rod and beam and in proper relation underneath the faucets, substantially as described.

2. The combination, with a series of two or more delivery-faucets, of a horizontal round supporting-rod arranged below the faucets and attached to the counter or ice-box, a block adapted to slide on the supporting-rod and provided with a projecting arm bearing on the counter, a scale-beam pivoted in the block and provided with a graduation and a movable weight, and a measuring-vessel detachably connected to the beam by a lateral arm, which sustains the vessel outside the rod and beam and in proper relation underneath the faucets, substantially as described.

3. The combination, with a series of two or more delivery-faucets, of the horizontal supporting-rod C, attached to the counter or ice-box underneath the faucets by the socket R and notched socket S, the block H, adapted to slide on the rod without turning thereon, the scale-beam D, pivoted in the block and provided with a graduation and a movable weight, and a measuring-vessel detachably connected to the beam by a lateral arm, which sustains the vessel outside the rod and beam and in proper relation underneath the faucets, substantially as described.

4. The combination, with a series of delivery-faucets, of a longitudinally-adjustable scale-beam provided with a movable weight and a foot or support for a measuring-vessel, and a movable supplementary weight, whereby the empty vessel may be balanced, substantially as described.

5. The combination, with a series of delivery-faucets, of the support A, the rod C, sliding block H, scale-beam D, pivoted to the sliding block and provided with foot Y, and the rod W and balancing-weight X, substantially as described.

EDWARD Y. GORDON.

Witnesses:
I. H. GORDON,
GEO. B. SELDEN.